Dec. 15, 1970          H. GERSTIN          3,546,773

PROCESS OF FABRICATING AN AMPHIBIOUS LOAD-SUPPORTING STRUCTURE

Filed Aug. 23, 1968          2 Sheets-Sheet 1

HARRY GERSTIN
INVENTOR.

BY *Dennis A. Lith*
AGENT

United States Patent Office 3,546,773
Patented Dec. 15, 1970

3,546,773
PROCESS OF FABRICATING AN AMPHIBIOUS
LOAD-SUPPORTING STRUCTURE
Harry Gerstin, Rolling Hills Estates, Calif., assignor to The Upjohn Company, Kalamazoo, Mich., a corporation of Michigan
Filed Aug. 23, 1968, Ser. No. 754,781
Int. Cl. B23p 19/04
U.S. Cl. 29—433
9 Claims

ABSTRACT OF THE DISCLOSURE

A method of in situ fabrication of bridging structures, docks, landing strips and like load-supporting structures. Polymer foam blocks having cable receiving conduits therein are produced from low bulk materials at or near the desired site, the blocks are assembled in edge to edge relationship and secured by cables traversing the conduits and anchored at the perimeters of the assembled structure. Surface reinforcement is an optional feature.

BACKGROUND OF THE INVENTION

Field of the invention

This invention relates to load-supporting structures and methods for their preparation and is more particularly concerned with load-supporting structures fabricated from polymer foam and with methods for the fabrication of same.

Description of the prior art

Numerous methods of making both temporary and permanent structures such as bridges, docks and wharves, platforms for supporting buildings in marshy areas, and the like, have been devised hitherto. Such methods have generally required that the structures in questions be prefabricated at some location remote from the ultimate site of construction and that the various prefabricated units of the final structure be transported to the ultimate site and erected thereon. This invention provides, for the first time, a method of producing load-supporting structures from building units which can be produced readily, at or near the ultimate construction site, from low bulk polymer forming materials which latter can be transported to the fabrication site with great ease. The starting materials required to produce the finished structure have a volume which is approximately 30 times less than the volume of the finished structure. The advantages of such a low bulk system will be readily apparent to one skilled in the art. Other advantages will become apparent as the following description unfolds.

SUMMARY OF THE INVENTION

This invention, in its broadest aspect, comprises a process for fabricating an amphibious load-supporting structure which process comprises the steps of:

(1) producing from polymer-foam-producing components a plurality of blocks of rigid polymer foam;
(2) forming a plurality of channels through each of said blocks in at least two directions substantially at right angles to each other, the longitudinal axes of said channels being disposed in planes parallel to that of the largest surface of each of said blocks in such a manner that when two or more of said blocks are assembled in symmetrical edge-to-edge relationship, the corresponding channels in each of said blocks form a series of continuous passageways;
(3) assembling said plurality of blocks in edge-to-edge relationship such that said corresponding channels in the individual blocks are aligned to form continuous passageways therethrough in two directions substantially at right angles to each other;
(4) passing cables through said continuous passageways within said assembled blocks, and
(5) anchoring the ends of said cables to anchoring means located on the perimeter of said assembled blocks.

The invention also comprises the amphibious load-supporting structures so produced.

DETAILED DESCRIPTION OF THE INVENTION

Figure 1:
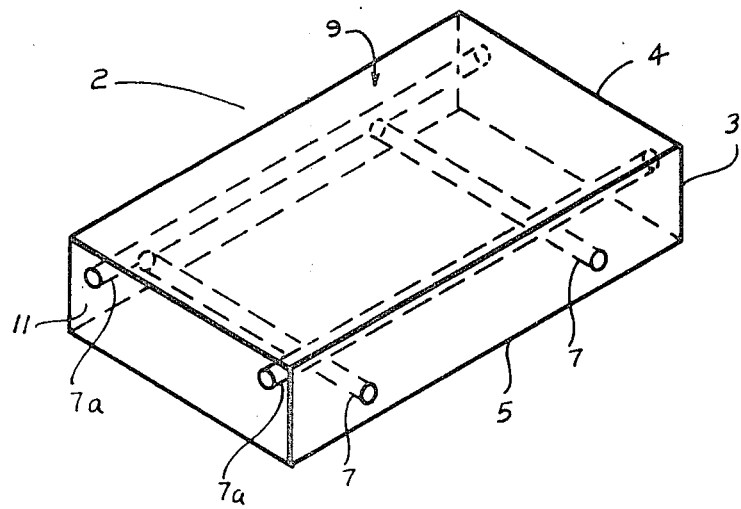
FIG. 1 is a perspective view of a particular embodiment of an individual block employed in the process and composition of the invention.

The first step in the process of the invention comprises the fabrication of the polymer foam block which is the essential basic unit of the structure of the invention. Said block can be fabricated using any of the techniques currently available for the preparation of polymer foams; see, for example, U.S. Pats. 3,336,243; 3,331,790; 3,324,053; 3,318,824; 3,311,573; 3,310,506; 3,087,901; 3,085,983; 3,080,329; 3,075,928; 3,075,926; 3,073,788; 3,072,582; 3,061,556; 3,060,137; 3,053,778; 3,050,477; 3,039,976; 3,037,946; 3,036,022; U.S. Reissue 24,514; Saunders et al., Polyurethanes, Chemistry and Technology, Part II, Interscience Publishers, New York (1964).

The fabrication of the polymer foam block can be readily accomplished at or near the construction site on which the finished structure is to be erected. It is merely necessary to transport to said site the chemical components used as starting materials for the foam and the apparatus, if any, conventionally employed to fabricate the desired foam from the said starting materials.

In a particular and preferred form of the invention the polymer foam block is a rigid polyurethane foam block. Rigid polyurethane foams can be prepared readily from polyisocyanates and polyols using catalysts, blowing agents, and like adjuvants conventionally employed in foam producing procedures known in the art; see Saunders et al., Polyurethanes, Chemistry and Technology Part II, John Wiley and Sons, 1964, pp. 193–298. The use of said materials in the process of the invention is particularly advantageous for the following reasons. The reaction of the polyisocyanate and polyol is one that can be carried out readily by admixture of the foam producing ingredients at or near room temperature. No heat or any other form of energy has to be applied to the foam reaction mixture after the reactants are brought together. Further, no complicated operations are necessary to cure or to process the foam after its formation. Said foam can be produced in a continuous or semicontinuous manner using any of the conventional polyurethane bunstock (slab stock) machines known in the art; see, Saunders et al., supra, page 84, et seq.

Additionally, the polyurethane rigid foams have a particular advantage for the present use in that there is an increase in volume of the order of 30 times on passing from the liquid, or semi-liquid starting materials to the finished foam. This is a factor which is of extreme importance where transportation of raw materials to the construction site is a major problem.

The foam producing equipment and supplies for producing the foam can be transported to the site of operations in any convenient manner. Where the structures of the invention are to be used to support loads on open water, it is convenient to install the foam producing equipment in water-borne carriers which are then taken to the desired site. In a particular embodiment of the invention the foam production equipment is installed in a ship, such as a tanker, which also has liquid storage facilities for the raw materials required in the foam production. Said vessel is also preferably equipped with cranes and/or ramps and the like, for off-loading the fabricated blocks of foam.

The polymer foam employed in the first stage of the process of the invention is conveniently fabricated in continuous slab form having a width of about 4 feet to about 40 feet or more depending upon the dimensions of the slab stock machine employed. The thickness of said slab stock will vary, as is well recognized in the art, depending upon the formulation used to produce the foam. Generally speaking, the thickness of the slab stock should be at least 12 inches and is preferably from about 2 feet to about 6 feet. The top surface of the slab stock, particularly in the case of polyurethane foam which has been allowed to rise freely, is generally not smooth. Said surface can, if desired, be trimmed, for example, by cutting, sanding, and the like processes in order to produce a planar surface. However, such treatment is unnecessary if the top surface of the finished load bearing structure is to be covered with reinforcing materials as discussed hereinafter.

As the slab stock is produced it is cut, using cutting means such as band saws, hot wire cutters, and the like, into appropriate lengths and shapes depending upon the desired dimensions and contour of the polymer foam block. Advantageously, the slab stock is cut so that the cross section of the block, in plan view, is square or rectangular. It will be appreciated, however, that the precise shape of said cross section is not critical and can be triangular, hexagonal, octagonal, and the like, so long as said shape is symmetrical and enables said blocks to be placed together in edge-to-edge relationship to form a substantially continuous upper surface for the desired load supporting structure.

In FIG. 1 there is shown a perspective view of a polymer foam block in one specific form of the invention. In this embodiment the block 2 takes the form of a hexahedron and is obtained by appropriate cutting of a continuous slab of polymer foam. The thickness 3 of the block 2 is advantageously at least about 2 feet and preferably is within the range of about 6 inches to about 6 feet. The width 4 of the block 2 advantageously corresponds approximately to the original width of the slab stock as it is formed and can be from about 4 feet to about 60 feet. Similarly, the length 5 of the block 2 is advantageously at least about 6 feet and can be as high as 1000 feet depending on the particular structure which is being prepared. The overall density of the block 2 is advantageously between about one (1) pcf. and about 4 pcf. and preferably is of the order of about 2 pcf. The desired density can be achieved by appropriate adjustment of formulating conditions as is well-recognized in the art of preparing polymer foams.

In the next stage of the process of the invention, the polymer foam block is treated to produce channels therethrough which are to receive the cable members employed in securing the individual blocks together in the final structure. Illustrative of said channels are those shown in FIG. 1 as channels 7 and 7a. In the specific embodiment of FIG. 1, said channels 7 and 7a are circular in cross-section but it will be appreciated that other cross-sectional configurations such as square, triangular, rectangular, and the like configurations can be employed. The longitudinal axes of the channels 7 are located in a plane parallel to the upper surface 9 of the block and are also parallel to the plane of the end surface 11 of said block. The channels 7a are similarly located in a plane parallel to that of the upper surface 9 of the block but at right angles to the plane in which the channels 7 are located. For reasons which will be obvious, the channels 7 and 7a are in different planes, i.e. they do not intersect. Reinforcing liners, such as hollow tubes conforming to the surface configuration of the channels 7 and 7a, can be inserted therein in order to prevent abrasion and degradation of the inner core of the foam by passage of the cables therethrough. Said reinforcing tubes can be fabricated from polymers, such as polyproplene, polyethylene, and the like, or from metals such as steel, aluminum, copper, and the like.

The channels 7 and 7a can be formed in said block 2 by any appropriate means, for example, by drilling, by cutting with hot rods or tubes, and the like. In a particular and preferred embodiment of the invention said channels can be produced in said block in situ during the actual formation of the slab stock from which the block is prepared. For example, by positioning hollow tubes or rods having an external dimension corresponding to that of the desired channels 7 and 7a in the trough in which the slab stock polymer foam is initially prepared there can be produced a slab stock having embedded in it said hollow tubes or rods. When the slab stock is cut to form said block 2, the hollow tubes or rods in said channels will also be cut and can, if desired, be withdrawn. Alternately and preferably, the hollow tube used to form the channel in situ can be left in place and act as reinforcing tube in the manner set forth above. In a preferred embodiment each end of said hollow tubes is provided with a flange which serves to maintain the tubes in place in the polymer foam blocks.

For simplicity of illustration FIG. 1 shows only two channels in each of two directions in said block 2. It will be understood that additional channels can be made in said block to provide for any number of cables in the assembly of said blocks. The actual number of channels desirable in any given case will depend on the dimensions of the block. Advantageously, it is found that at least one channel is required for each running foot of foam edge.

In the third step of the process of the invention the polymer blocks having the channels formed therein are assembled in edge-to-edge relationship in such a manner that the channels in each block interconnect with corresponding channels in each of the abutting blocks, thereby forming continuous channels in each of two directions at right angles through the assemblage of blocks.

Figure 2:
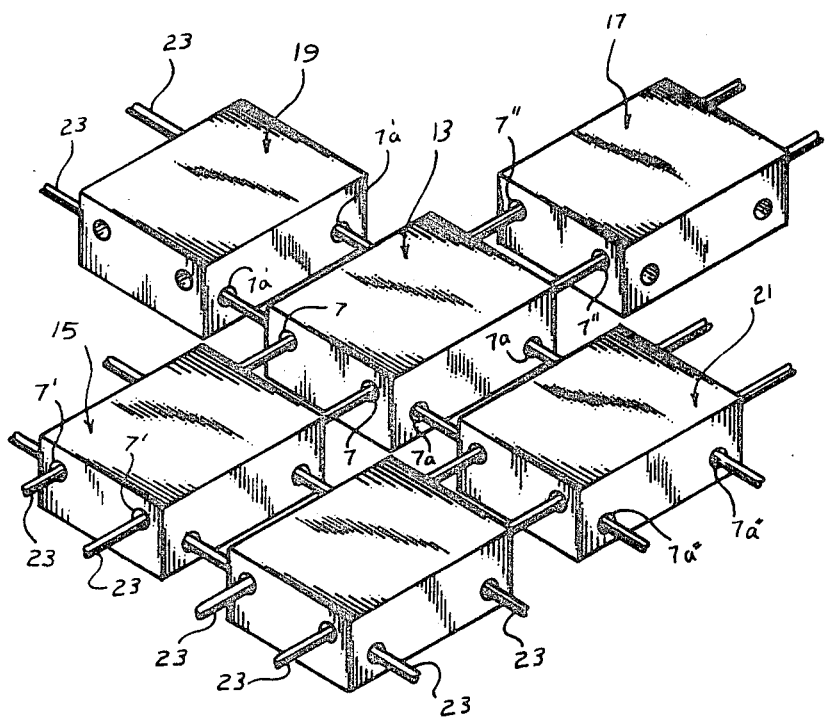
FIG. 2 is a perspective view illustrating a particular embodiment of an assembly of individual blocks in a structure according to the invention.
Figure 3:
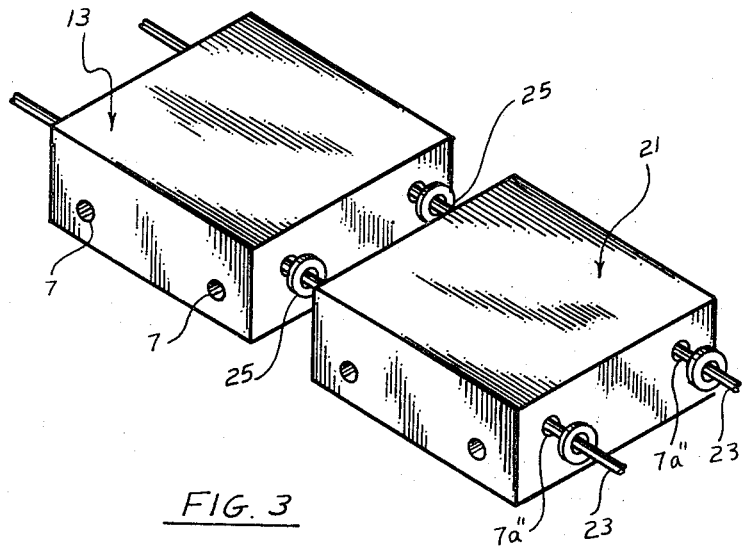
FIG. 3 is a perspective view illustrating a further embodiment of the method of fabricating a structure according to the invention.

FIG. 2 shows an illustrative embodiment of a number of blocks, constructed in accordance with the embodiment of FIG. 1, in the process of being assembled in edge-to-edge relationship preparatory to the final stage of the process of the invention. It will be seen that the channels 7 in block 13 are aligned so that the longitudinal axes thereof are coincident with those in channels 7' and 7" in the adjacent blocks 15 and 17. Similarly, the longitudinal axes of the channels 7a in block 13 are aligned so that they are coincident with the corresponding axes of channels 7a' and 7a" in blocks 19 and 21. The gap between the abutting edges of the various blocks 13, 15, 17, etc., can be varied as desired depending on the degree of flexibility or rigidity desired in the resultant assembly. In the illustration of FIG. 2 the gaps are portrayed as large for purposes of illustration only. In practice said gaps are generally from about 1 inch to about 12 inches. If desired, spacer elements can be placed between the abutting edges of the various blocks in the assembly thereby reducing or preventing the abrasion and degradation caused by distorting forces due to loads placed on the finally assembled blocks. Said spacer elements can cover the whole or a part of the abutting surfaces of the blocks and can be constructed from synthetic or natural rubber or like elastomeric materials. In FIG. 3 there is shown a specific embodiment wherein spacer elements 25 take the form of flat, circular discs interposed between the abutting faces of blocks 13 and 21.

Figure 4:
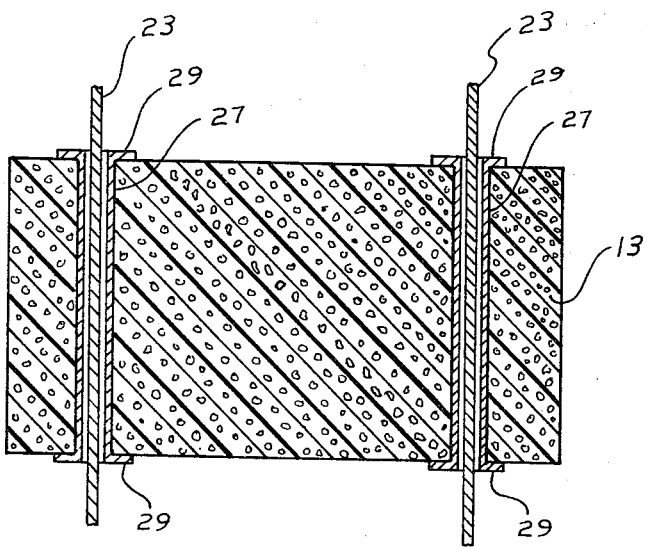
FIG. 4 is a cross-sectional plan view showing a further embodiment of the structure according to the invention.

It will be appreciated, however, that the spacer elements 25 can assume other shapes and forms as will be obvious to one skilled in the art. In a particularly preferred embodiment of the invention the spacer elements 25 shown in FIG. 3 are integral with the outer ends of hollow tubes which are inserted in the channels 7a in the block 13. Such an embodiment is shown in FIG. 4 which is a cross-sectional plan view of the block 13 of FIG. 3 taken through the plane in which the cables 23 each lie. In the embodiment of FIG. 4 the hollow tubes 27 are present as a lining separating the cables 23 from the surface of the block 13 through which said cables 23 pass. The hollow tubes 27 have integral flanges 29 which abut the outer edges of the block 13 and serve to hold the hollow tubes 27 in place within the block 13. It will be appreciated by one skilled in the art that the most convenient manner in which to fabricate such an embodiment is to form the polymer foam block 13 in place around the tubes 27. This can readily be accomplished by supporting the tubes 27 in place in the appropriate position in the mold in which the block 13 is formed while the foam reaction mixture is poured into the mold and is allowed to foam thereby surrounding and embedding the tubes 27. Alternatively, the tubes 27 can be fabricated in two sections each with its integral flange 29 and said sections can be inserted into either end of the channel within the block 13 after the latter has been formed. Other alternative means of providing such linings within the channels in the blocks 13 will be apparent to one skilled in the art.

In the fourth stage of the process according to the invention, cables are passed from the outer edge of the assemblage of blocks through each of the interconnecting channels to the other end of each channel. Illustrative of said cables are those shown as 23 in FIG. 2. It will be appreciated that the insertion of the cable can be made after all the blocks have been brought together in the required relationship. More conveniently and preferably, as each block is brought into the desired relation with its neighbors, cables are passed therethrough to secure it in place. Said cables can be fabricated from metal, rope, synthetic fibers, and the like, and are preferably sufficiently flexible to permit ease of assembly of the blocks. The dimensions of the cables employed can vary according to the required strength of said cable and the number of cables employed. Advantageously, there should be at least one cable for each 2 feet of perimeter of the structure. The dimensions of the channels 7 and 7a are so chosen that they permit insertion of the cables without excessive clearance. Advantageously, the maximum size of said channels is of the order of about 4 to 6 inches diameter.

In the final step of the process of the invention the cables which have been passed through the various channels in the assembly are anchored by any suitable anchoring means on the perimeters of said assembled blocks. Examples of suitable anchoring means are cleats, ring bolts through which the cables are passed and secured by knots, and the like.

Preferably, said cables are subjected to tensioning forces, using winches and like means, prior to being anchored to said anchoring means.

If desired, reinforcing materials such as metal or plastic plates and the like, can be placed on the upper surface on the upper surface of the assembled structure or can be placed on the surface of each of the blocks prior to assemblage in the structure. The nature and amount of reinforcement will depend on the particular use to which the structure is to be placed. As will be obvious to one skilled in the art, by assembling the appropriate number of blocks in the appropriate configurations, it is possible to make any type of load-supporting structure from a long, narrow bridge to a substantially square floating platform.

I claim:

1. A process for fabricating an amphibious load-supporting structure which comprises the steps of:
   (1) producing, from polymer foam producing components, a plurality of blocks of rigid polymer foam;
   (2) forming a plurality of channels through each of said blocks in at least two directions substantially at right angles to each other, the longitudinal axes of said channels being disposed in planes parallel to that of the largest surface of each of said blocks in such a manner that when two or more of said blocks are assembled in edge-to-edge relationship, the corresponding channels in each of said blocks form a series of continuous substantially linear passageways;
   (3) assembling said plurality of blocks in edge-to-edge relationship such that said corresponding channels in the individual blocks are aligned to form continuous passageways therethrough into directions substantially at right angles to each other;
   (4) passing cables through said continuous passageways within said assembled blocks; and
   (5) anchoring the ends of said cables to anchoring means located on the perimeter of said assembled blocks.

2. The process of claim 1 wherein said blocks of rigid polymer foam are produced by reacting a polyisocyanate and a polyol under foam producing conditions.

3. The process of claim 1 wherein said blocks of rigid polymer foam have a density from about 1 pcf. to about 40 pcf.

4. The process of claim 1 wherein a reinforcing layer is placed over the exposed surface of said amphibious load-supporting structure.

5. A process for fabricating an amphibious load-supporting structure which comprises the steps of:
   (1) reacting a polyisocyanate and a polyol under foam producing conditions to form a plurality of substantially rectangular rigid polyurethane blocks having a density within the range of about 1 pcf. to about 40 pcf.;
   (2) making a plurality of channels through each of said blocks the longitudinal axes of said channels being substantially linear and lying in planes parallel to that of the largest surface of each of said blocks and being disposed in at least two directions at right angles to each other one of said directions being parallel to that of the longest edge of said block, the location of said channels in each block being in correspondence;
   (3) assembling said plurality of blocks in edge-to-edge relationship such that said corresponding channels in the individual blocks are aligned to form continuous substantially linear passageways therethrough;
   (4) passing cables through said continuous substantially linear passageways within said assembled blocks; and
   (5) anchoring the ends of said cables to anchoring means located on the perimeters of said assembled blocks.

6. The process of claim 5 wherein a reinforcing layer is placed over the exposed surface of said amphibious load-supporting structure.

7. The process of claim 6 wherein spacer elements are placed between the abutting surfaces of said rigid polyurethane blocks.

8. The process of claim 5 wherein linear tubes are placed within the channels in said polymer foam blocks.

9. The process of claim 5 wherein the formation of the rigid polyurethane foam blocks is carried out aboard a water borne vessel fitted with foam producing machinery and said blocks are off-loaded from said vessel prior to assembly.

References Cited

UNITED STATES PATENTS

| | | | |
|---|---|---|---|
| 1,933,597 | 11/1933 | McVitty | 114—43.5 |
| 2,256,645 | 9/1941 | Kuhlman. | |
| 2,362,596 | 11/1944 | Trottler. | |
| 2,388,171 | 10/1945 | McVitty | 114—43.5 |
| 2,573,087 | 10/1951 | Youngblood et al. | 29—433X |
| 2,892,433 | 6/1959 | Walker | 114—43.5 |
| 3,029,606 | 4/1962 | Olsen | 114—43.5X |
| 3,221,696 | 12/1965 | Gardner | 114—43.5 |
| 3,237,414 | 3/1966 | Straub et al. | 114—43.5X |

CHARLIE T. MOON, Primary Examiner

U.S. Cl. X.R.

29—241; 114—43.5; 244—114